Dec. 2, 1947.                D. E. CATLIN                2,431,918
VACUUM CAR HEATER
Filed March 12, 1946
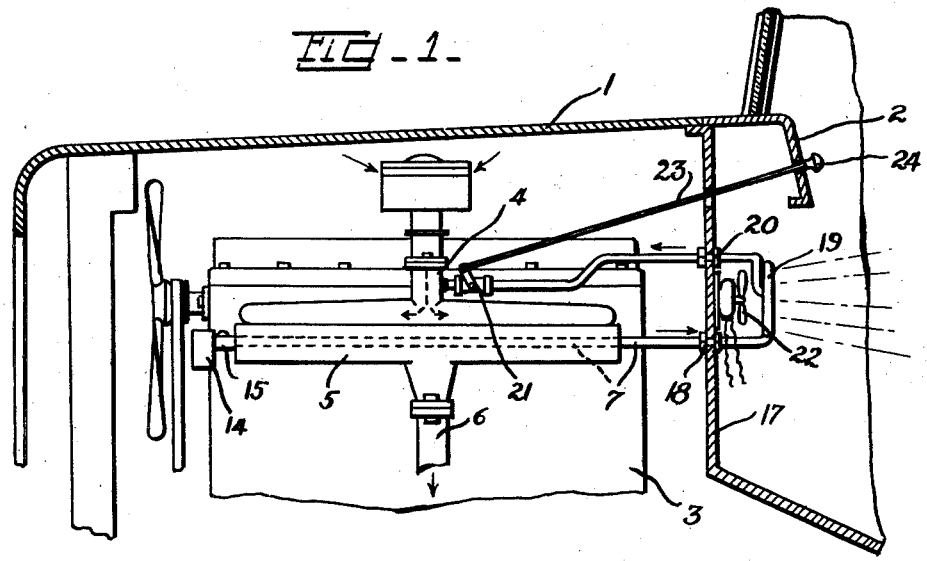
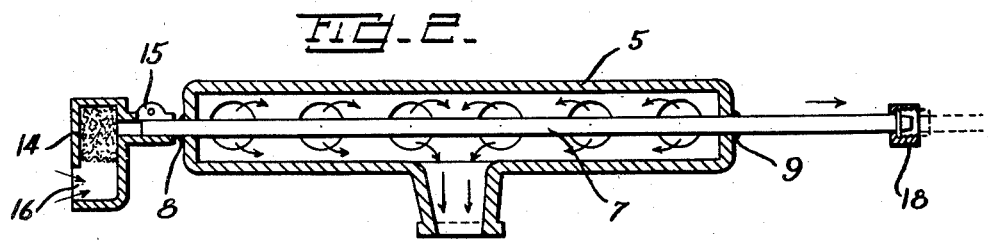
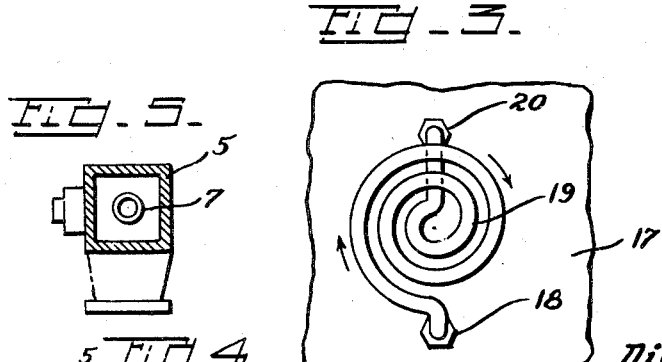
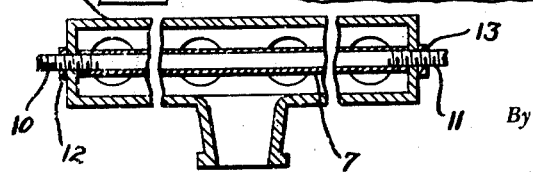
Inventor
Dick E. Catlin
By
Clarence A. O'Brien
and Harvey B. Jacobson
Attorneys Patented Dec. 2, 1947

2,431,918

UNITED STATES PATENT OFFICE 2,431,918

VACUUM CAR HEATER

Dick E. Catlin, Kutch, Colo.

Application March 12, 1946, Serial No. 653,892

1 Claim. (Cl. 237—12.3)

This invention relates to improvements in car heaters.

An object of the invention is to provide an improved car heater utilizing heat from the exhaust manifold of the car engine when running to heat the interior of the car body.

Another object of the invention is to provide an air tube extending through the exhaust manifold of a car engine, the same being coiled to provide a heat radiating surface, and having connection with the intake manifold of a car engine, whereby a continuous flow of air will be drawn through said air tube by the vacuum or suction in the intake manifold to efficiently heat the interior of a car.

A further object of the invention is to provide an air tube extending through the exhaust manifold of a car engine, the inlet end of said air tube being provided with an air filter, and the outlet end of said air tube being controlled by a valve operable from the car dash and connected with the intake manifold of the car engine, together with a fan blower for directing a stream of air over said heated air tube to efficiently and effectively warm or heat the interior of a car thus equipped.

A still further object of the invention is to provide an improved car heater which will be highly efficient in operation, and relatively inexpensive to manufacture and produce.

Other objects will appear as the description proceeds.

In the accompanying drawings which form a part of this application,

Figure 1 is a side elevation of the improved car heater installed on the car engine;

Figure 2 is a longitudinal sectional view through the exhaust manifold of the car engine and the air filter to which the air tube is connected;

Figure 3 is a front elevation of the air heating coil;

Figure 4 is a sectional view through the exhaust manifold of a car engine showing a second means for securing the air tube in the manifold, and Figure 5 is a transverse sectional view through the exhaust manifold.

Like characters of reference are used throughout the following specification and the accompanying drawings to designate corresponding parts.

In carrying out the invention, there is provided an automobile or car having a body generally denoted by the reference numeral 1, and an associated dashboard 2.

An engine 3 is provided with the usual form of intake manifold 4 and exhaust manifold 5, which will be connected by the pipe 6 to the usual muffler (not shown).

The air inlet pipe 7 will be positioned longitudinally in the exhaust manifold and will extend a considerable distance beyond the opposite ends thereof. In Figure 2 of the drawings, the pipe or tube 7 is shown welded as at 8 and 9 to the ends of the exhaust manifold, while in Figure 4 of the drawings, the pipe or tube 7 is shown supported by the externally threaded nipples 10 and 11, which will be adapted to screw through the opposite ends of the exhaust manifold 5 and into the opposite ends of said tube 7, and to be held firmly therein by means of the locking nuts 12 and 13 threaded on said nipples 10 and 11. In either construction, it will be impossible for the exhaust gases with the deadly carbon monoxide gas to get into the air tube or pipe 7.

A filter housing 14 will be formed with a clamping collar 15 adapted to be secured on the forward end of the air tube or pipe 7, and will be provided with an air inlet aperture 16, and will support a suitable quantity of filter material within the housing, such as spun glass or any other desired filtering agent.

The end of the air tube or pipe 7 after it leaves the exhaust manifold 5, will be connected through the front board 17 of the automobile or car body 1 by means of a union or coupling 18 to one end of a pipe or heater coil 19, whose opposite end is likewise connected by a union or coupling 20 through the front board 17, to the intake manifold 4 on the car engine.

A valve 21 will be connected in the pipeline adjacent the intake manifold 4 for controlling the vacuum or suction to draw fresh air through the air filter 14 and through the exhaust manifold to be heated, then to be passed through the heating coil 19, where a small electric fan 22 will direct a stream of air over the heated coil, to heat the air in the car body. A valve operating rod 23 will be connected to the valve 21, and will extend through the car dashboard 2, and terminates with or supports a knob or handle 24 on its upper extremity, whereby when it is desired to operate the heater, it is only necessary to pull up on the knob or handle 24 connected with the valve operating rod 23 to open the valve 21, thus when the car engine is running, the suction from the intake manifold will draw a continuous supply of fresh air through the inlet pipe extending through the exhaust manifold, there to be heated and directed to the coil, where the fan will blow air over the coil, and in so doing, will warm or heat the car interior.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

In combination with an automobile and an internal combustion engine therefor, of an air heater for heating the interior of said automobile and for heating an auxiliary air supply for said engine including an auxiliary air pipe open at its forward end extending longitudinally through the engine exhaust manifold from a point at the front thereof and lying directly opposite the exhaust ports therein, an air filter on the front end of said auxiliary air pipe for filtering the auxiliary air passing therethrough, said pipe extending into the body of the automobile and being shaped to form a coil from which a pipe extends forwardly to connect with the engine intake manifold, a cut-off valve in said pipe adjacent the engine inlet manifold operable from the automobile dash, and an air impeller disposed forwardly of said coil for blowing a current of unheated air over the heated coil through which heated air is led to the engine intake manifold for heating the air blown by said impeller to heat the interior of said automobile.

DICK E. CATLIN.

REFERENCES CITED

The following references are of record in the file of this patent:

UNITED STATES PATENTS

| Number | Name | Date |
|---|---|---|
| 1,493,541 | Hiatt | May 13, 1941 |
| 2,262,003 | Huffman et al. | Nov. 11, 1941 |